(No Model.)
E. DEDERICK
BICYCLE.
No. 586,596. Patented July 20, 1897.
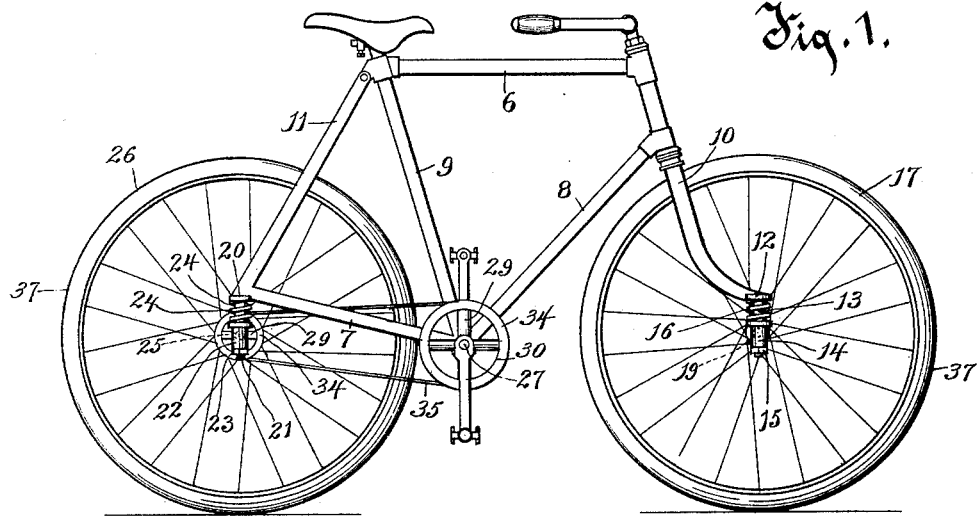
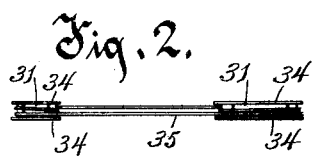
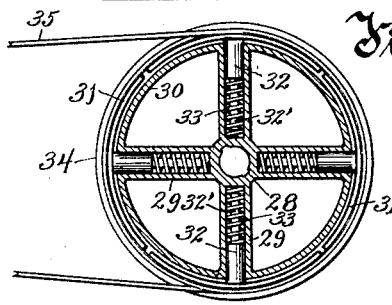
Witnesses.
O. N. Keeney
Josephine Faust
Inventor.
Ezra Dederick
By Benedict and Morsell
Attorneys.

UNITED STATES PATENT OFFICE.

EZRA DEDERICK, OF MILWAUKEE, WISCONSIN.

BICYCLE.

SPECIFICATION forming part of Letters Patent No. 586,596, dated July 20, 1897.

Application filed December 4, 1896. Serial No. 614,464. (No model.)

*To all whom it may concern:*

Be it known that I, EZRA DEDERICK, of Milwaukee, in the county of Milwaukee and State of Wisconsin, have invented a new and useful Improvement in Bicycles, of which the following is a description, reference being had to the accompanying drawings, which are a part of this specification.

My invention has relation to improvements in bicycles.

The primary object contemplated is the provision of an improved form of wheels for transferring the rotation of the driving-axle to the rear wheel, said improved form of wheels designed to act as substitutes for the ordinary sprocket-wheels and chain.

With the above primary object in view the invention consists of the devices and parts or their equivalents, as hereinafter more fully set forth.

In the accompanying drawings, Figure 1 is a side elevation of a bicycle equipped with my improvements. Fig. 2 is a detail plan view of the wheels which are designed to take the place of the ordinary sprocket-wheels, showing the wire or cable which passes around said wheels. Fig. 3 is a vertical sectional view, on an enlarged scale, of one of my improved wheels.

I have shown my improvements applied to a bicycle having a spring-actuated frame, the following being a description of said frame:

6 indicates the upper tube or bar; 7, the lower tube or bar; 8, the forward tube; 9, the seat-standard; 10, the front fork, and 11 the rear fork.

Each arm of the front fork is formed at its lower end with a shoulder 12, said shoulder formed with a depending rod 13. This rod passes through a block 14, advisably of cylindrical form, said block being held in place upon the lower end of the rod by means of a nut 15, engaging the lower threaded extremity of the rod. Above the block the rod is encircled by a coiled spring 16, the lower end of said spring bearing against the upper surface of the block and the upper end of the spring against the under side of the shoulder 12. The front steering-wheel of the machine is indicated by the numeral 17 and its axle by the numeral 18. The opposite ends of this axle are threaded, and each threaded extremity enters a threaded socket 19 in the inner side of the block 14. A similar yielding connection for the rear axle is also provided, each arm or member of the rear fork being formed with a shoulder 20 and with a depending rod 21. The block through which the rod 21 passes is indicated by the numeral 22, the nut on the extremity of the rod to hold the block in place by the numeral 23, and the coiled spring by the numeral 24. The block 22 of course is provided with a threaded socket 25 to receive the threaded end of the axle of the rear wheel 26.

The novel feature of my invention resides in the employment of a peculiar form of wheel to take the place of the sprocket-wheel ordinarily used. Upon the driving-axle 27 is mounted one of these wheels and upon the rear driven axle the other of said wheels, the latter wheel being smaller than the one mounted on the driving-axle. Both of these wheels are similarly constructed, and each consists of a central hub 28, having a series of tubular spokes 29 radiating therefrom, the outer ends of said spokes being connected by a circumferential rim 30. The opening or bore of each spoke extends through the rim. A series of segments 31 are adjusted around the rim, and each of these segments is provided with an inwardly-extending finger 32, which passes through the appropriate opening of the rim and enters the tubular spoke. The inner end of each finger is provided with a projecting reduced stem 32', which is encircled by a coiled spring 33. The inner end of the finger forms a shoulder against which the outer end of the spring takes its bearing, while the inner end of said spring bears against the hub. The several segments, when adjusted to the wheel-rim, form a complete circle around the rim, and said rim at its edges is provided with outwardly-projecting flanges 34. In lieu of the ordinary sprocket-chain I employ a wire 35, preferably a copper wire, or, if preferred, a cable of any material may be employed, which is passed around the two wheels, being advisably wound twice around each wheel. The flanges 34 form between them a grooveway for the wire and also for the segments. It is obvious that the coiled springs 33 constantly exert an outward pressure against the segments, and as the wire is wound around the segments of course said segments cannot be forced out of place by the spring-pressure. It is furthermore apparent that when the driving-axle is revolved by the action of the feet on the treadles the outward pressure of the springs causes sufficient friction to prevent slipping of the wire and thereby cause a movement of said wire and a consequent rotation of the rear wheel. This construction, therefore, does away entirely with the necessity of providing sprocket-wheels and the chain for connecting said sprocket-wheels, as now generally used.

Having thus described my invention, what I claim is—

1. A wheel comprising a central hub, a series of tubular spokes radiating therefrom, said spokes being connected by an outer circumferential rim provided with openings registering with the bores of the spokes, segments arranged around said rim, and coiled springs within the bores of the spokes and adapted to press outwardly against the segments.

2. A wheel, comprising a central hub, a series of tubular spokes radiating therefrom, said spokes being connected by an outer circumferential rim provided with openings registering with the bores of the spokes, segments arranged around said rim, and provided with inwardly-extending fingers passing a desired distance into the bores of the spokes, and coiled springs within the bores of the spokes and interposed between the hub and the inner ends of the fingers.

3. A wheel, comprising a central hub, tubular spokes radiating therefrom, said spokes connected by an outer circumferential rim provided with openings registering with the bores of the spokes, and said rim also provided with edge outstanding flanges, segments arranged around the periphery of the rim, said segments provided with inwardly-extending fingers passing into the bores of the spokes, said fingers provided with reduced portions or stems, and coiled springs encircling said reduced portions or stems, and interposed between the hub and the inner ends of the fingers.

4. The combination, with wheels, each consisting of a central hub having radiating tubular spokes connected by an outer circumferential rim, said rim provided with openings registering with the bores of the spokes, segments arranged around the rim, and springs within the spokes and adapted to press outwardly against the segments, of a wire or cable passing from one wheel to the other, and wound a plurality of times around the segments of each of said wheels.

In testimony whereof I affix my signature in presence of two witnesses.

EZRA DEDERICK.

Witnesses:
ARTHUR L. MORSELL,
ANNA V. FAUST.